(12) United States Patent
Penaforte et al.

(10) Patent No.: US 10,000,041 B2
(45) Date of Patent: Jun. 19, 2018

(54) METHOD FOR MAKING A DECORATIVE MULTILAMINAR VENEER

(71) Applicant: ALPI S.P.A., Modigliana (IT)

(72) Inventors: Alberto Penaforte, Modigliana (IT); Lorenza Farina, Modigliana (IT); Daniela Nisiro, Modigliana (IT); Pasquale Carmellino, Modigliana (IT)

(73) Assignee: ALPI S.P.A., Modigliana (IT)

( * ) Notice: Subject to any disclaimer, the term of this patent is extended or adjusted under 35 U.S.C. 154(b) by 888 days.

(21) Appl. No.: 14/446,648

(22) Filed: Jul. 30, 2014

(65) Prior Publication Data
US 2015/0037528 A1 Feb. 5, 2015

(30) Foreign Application Priority Data

Aug. 1, 2013 (EP) .................................... 13178899

(51) Int. Cl.
*B27L 5/00* (2006.01)
*B44C 3/02* (2006.01)
(Continued)

(52) U.S. Cl.
CPC ............. *B32B 21/14* (2013.01); *B27D 1/08* (2013.01); *B27L 5/00* (2013.01); *B32B 3/14* (2013.01);
(Continued)

(58) Field of Classification Search
CPC .... A01G 23/08; A01G 23/083; A01G 23/085; A01G 23/093; A01G 23/097; B27L 1/00; B27L 1/005
(Continued)

(56) References Cited

U.S. PATENT DOCUMENTS 3,977,449 A * 8/1976 Sadashige ................. B27B 1/00
144/351
4,388,133 A 6/1983 Hirao et al.
(Continued)

FOREIGN PATENT DOCUMENTS

EP 1616680 1/2006
GB 861411 2/1961
(Continued)

*Primary Examiner* — Shelley Self
*Assistant Examiner* — Maleshia Jones
(74) *Attorney, Agent, or Firm* — Silvia Salvadori, P.C.; Silvia Salvadori

(57) ABSTRACT

A method for making a decorative multilaminar veneer with accentuated curvilinear shapes consists of the steps of: obtaining sheets of wood from a log of wood or from a block of multilaminar wood; superimposing and permanently sticking the sheets of wood on top of one another to form a plurality of packets of sheets of wood; providing a plurality of male molds and at least one female countermold, wherein each male mold has a convex curvilinear profile with different curvature radiuses of one mold with respect to the other and wherein the female countermold has a concave curvilinear profile; arranging, pressing and permanently sticking together several packets, in sequence and superimposed, between the female countermold and in sequence the male molds to deform in a curvilinear manner the packets, replacing in sequence, upon the reaching of a preset height of the superimposed, joined and deformed packets a male mold with a profile with a greater curvature radius with a successive male mold with a profile with a lesser curvature radius; obtaining a sliceable block formed by said superimposing, joining and deforming of packets of the sheets of wood; slicing said block to obtain a decorative multilaminar veneer.

11 Claims, 17 Drawing Sheets

(51) Int. Cl.
*B27D 1/08* (2006.01)
*B32B 21/14* (2006.01)
*B32B 3/14* (2006.01)
*B32B 7/12* (2006.01)
*B44C 5/04* (2006.01)

(52) U.S. Cl.
CPC .................. *B32B 7/12* (2013.01); *B44C 3/02* (2013.01); *B44C 5/043* (2013.01); *B32B 2451/00* (2013.01); *Y10T 428/17* (2015.01)

(58) Field of Classification Search
USPC ....... 144/380, 381, 256.1, 256.2, 256.4, 255
See application file for complete search history.

(56) References Cited

U.S. PATENT DOCUMENTS

| | | | | |
|---|---|---|---|---|
| 4,731,145 A | * | 3/1988 | Senzani | B27L 5/00 144/348 |
| 2013/0065013 A1 | * | 3/2013 | Fischer | B27D 1/04 428/106 |

FOREIGN PATENT DOCUMENTS

| | | |
|---|---|---|
| GB | 1391077 | 4/1975 |
| WO | 2007/093262 | 8/2007 |

* cited by examiner $P_{1.1}, ..., P_{1.n}, P_{2.1}, ..., P_{2.n}, P_{3.1}, P_{3.2}, ....$ $P_{1.1}, ..., P_{1.n}, P_{2.1}, ..., P_{2.n}, P_{3.1}, P_{3.2}, ....$ $P_{1.1}, ...., P_{1.n}, P_{2.1}, ...., P_{2.1}, P_{3.1}, P_{3.2}, ....$ $P_{1.1}, ...., P_{1.n}, P_{2.1}, ...., P_{2.n}, P_{3.1}, P_{3.2}, ....$

METHOD FOR MAKING A DECORATIVE MULTILAMINAR VENEER

This Application claims priority to and the benefit of European Patent Application No. 1317889.4 filed on Aug. 1, 2013, the content of which is incorporated by reference in its entirety.

BACKGROUND OF THE INVENTION

The present invention relates to a method for making a decorative multilaminar veneer.

PRIOR ART

As is known, for veneering in the woodworking industry common veneers or multilaminar veneers are used.

The common veneer is obtained by reducing a log of fine wood into sheets.

In order to make the multilaminar veneer, logs of low-quality wood are peeled off in a circular manner. The sheets obtained are preferably but not necessarily bleached and are then dyed. The various sheets of dyed wood are then glued until a block of wood is obtained that is finished and which can have a parallelpipedon or prismatic shape. Lastly, the block of wood that is thus obtained is cut into sheets to obtain the decorative multilaminar veneer. The various layers of colored wood simulate the rings of the log of wood, recreating the grains and crown shapes of the natural veneer.

The advantage of the multilaminar veneer over a common veneer is the greater homogeneity, which makes it, for example, more suitable for the production of furniture components that have to be matched without variations in color and tone.

Currently, the decorative multilaminar veneer market has a large number of figurative patterns than can be grouped into the following major classes:
burl
crown
straight grain or fine line
wavy shape.

On the other hand, in production, difficulties in producing curvilinear shapes have been found.

The wavy-shape motif can have curves, but only slight curves: for example on a sheet that is longer than two meters the size of a curve is just a few centimeters because the maximum angle of intersection between the tangents to the curve never exceeds 30°. Greater radiuses have been obtained by creating lines broken up by the addition of straight portions and never through rounded continuous curves without sharp edges.

OBJECT OF THE INVENTION

The object of the present invention is to propose a method for making a decorative multilaminar veneer that enables regular curvilinear decorative patterns with high curvature angles to be obtained.

BRIEF DESCRIPTION OF THE INVENTION

This object is achieved by a method for making a decorative multilaminar veneer.

BRIEF DESCRIPTION OF THE DRAWINGS

In order to understand the invention better, a description of a non-limiting embodiment thereof is shown below by way of non-limiting example that is illustrated in the attached drawings, in which:

FIGS. 5A-8A, 5B-8B show, respectively in a frontal and perspective view, a first curving step, following the preceding step, of the method according to the invention;

FIGS. 9A-11A, 9B-11B show, respectively in a frontal and perspective view, a second curving step of the method according to the invention;

FIGS. 12A-15A, 12B-15B show, respectively in a frontal and perspective view, a third curving step of the method according to the invention;

FIGS. 17A-18A, 17B-18B show, respectively in a frontal and perspective view, subsequent steps of completing the aforesaid product;

DETAILED DESCRIPTION OF THE INVENTION

With reference to FIGS. 1A, 1B, 2A, 2B, 3A, 3B, preliminary operations of the method are provided, wherein a series of three male molds M1, M2, M3 and a female countermold F are made. The molds and the countermold can be made of wood, for example high-pressure plywood, and can be shaped by a numerically controlled milling unit D. Alternatively, the molds and the countermold can be made of metal or resin. The male molds M1, M2, M3, have a symmetrical convex curvilinear profile, with a decreasing curvature radius going from M1 to M3, as well visible in FIG. 3A. The female countermold F has a symmetrical concave curvilinear profile.

The method starts with peeling off in a circular manner logs of low-quality wood, for example ayous, poplar or basswood, so as to obtain sheets that are at most 2 mm thick.

The sheets obtained are first subjected to bleaching to homogenize the various sheets and then to dying to color the sheets in a uniform or varied manner.

Figure 1A:
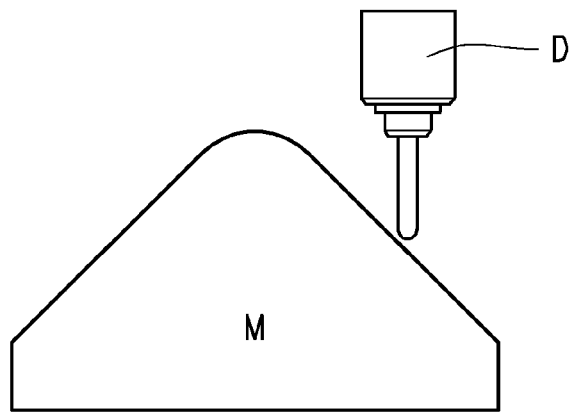
FIGS. 1A, 1B show respectively in a frontal and perspective view, the making of a mold to be used in the method for making a decorative multilaminar veneer according to the invention.
Figure 1B:
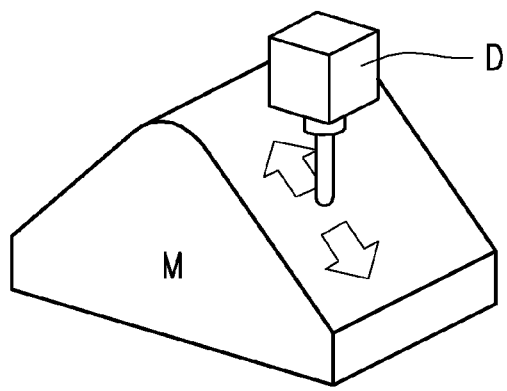
Figure 2A:
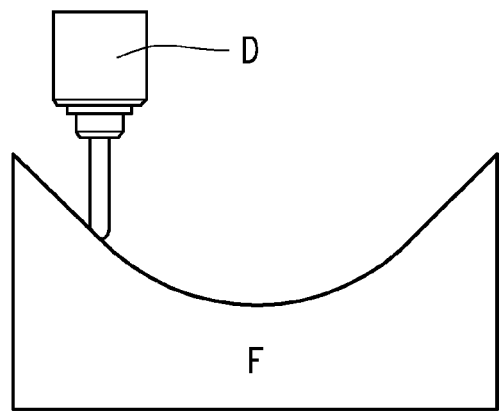
FIGS. 2A, 2B show, respectively in a frontal and perspective view, the making of a countermold to be used in the method according to the invention.
Figure 2B:
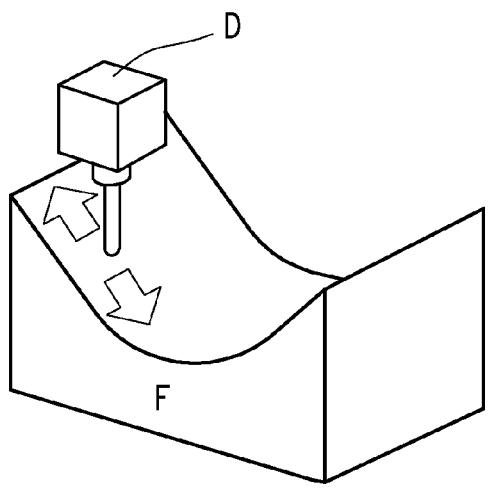
Figure 3A:
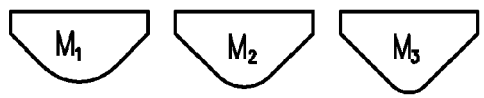
FIGS. 3A, 3B show respectively in a frontal and perspective view three types of mold to be used in the method according to the invention.
Figure 3B:
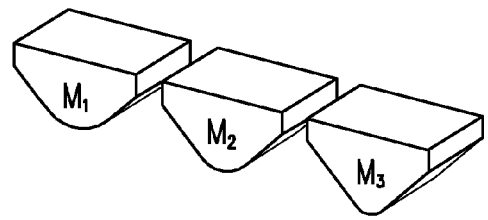
Figure 4:
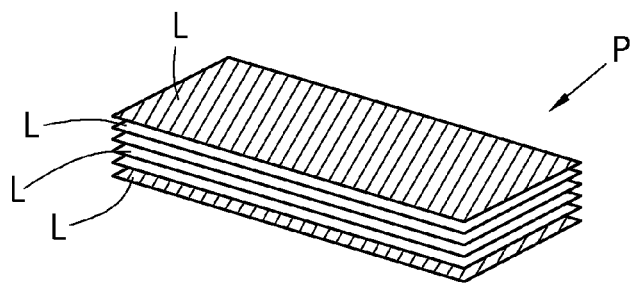
FIG. 4 shows a step of the method according to the invention.
Figure 5A:
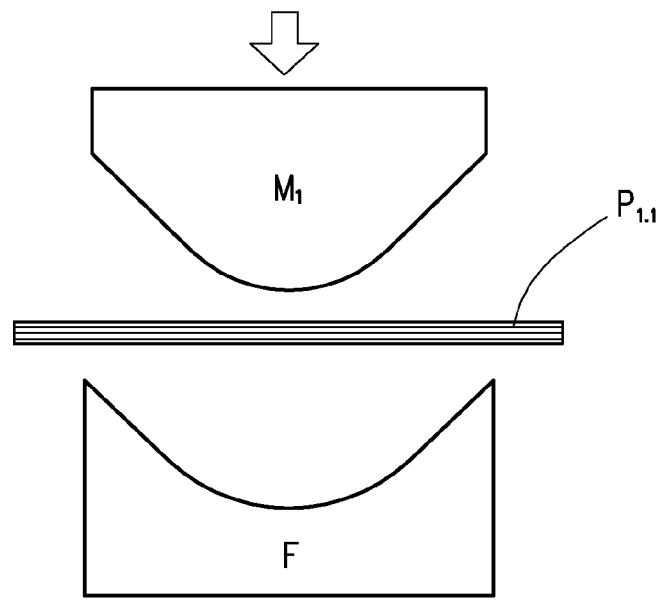
Figure 5B:
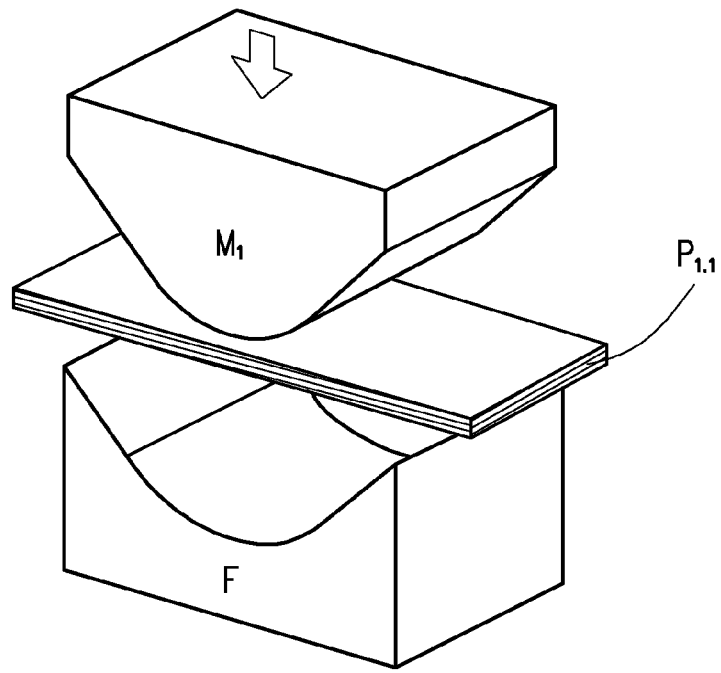
Figure 6A:
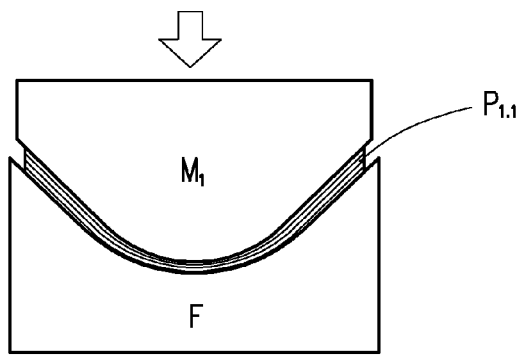
Figure 6B:
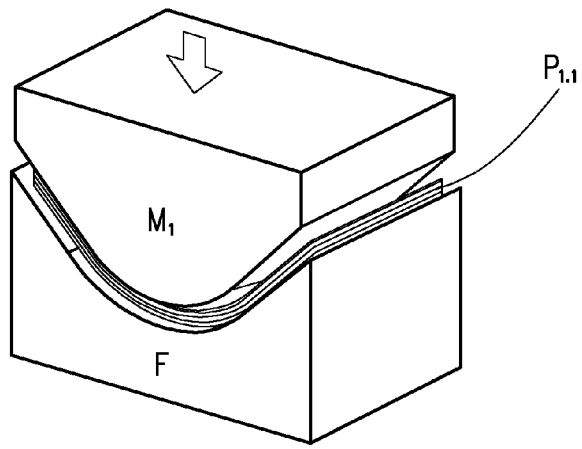

At this point packets of sheets are prepared, each obtained by stacking a series of sheets on one another, on each of which a gluing mixture has been spread on one or both sides. The single packet of sheets, illustrated in FIG. 4 where the sheets are illustrated by L and the packet by P, can have a thickness of several centimeters.

As illustrated in FIGS. 5A, 5B, 6A, 6B, a first packet P1.1 is introduced between the first mold M1 and the countermold F and is pressed therebetween so that it is permanently deformed according to a curvilinear profile.

Figure 7A:
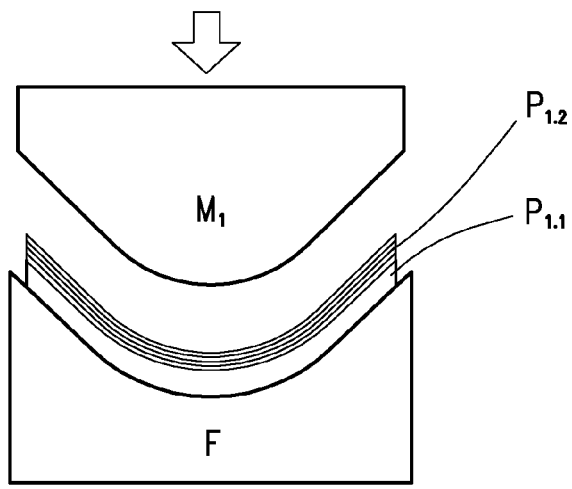
Figure 7B:
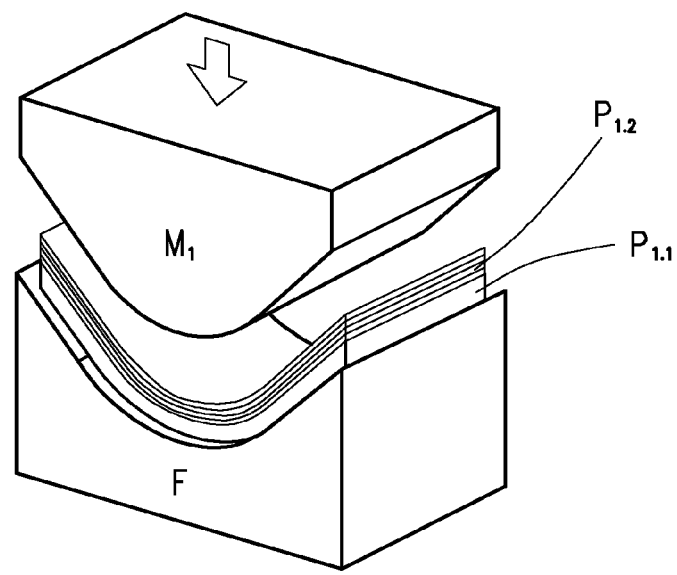

Subsequently, a second packet is prepared, similarly to the first packet P1.1. With reference to FIGS. 7A, 7B, this second packet, indicated by P1.2, is introduced between the first mold M1 and the countermold F above the first packet P1.1 and is pressed therebetween for the permanent curved deformation.

Figure 8A:
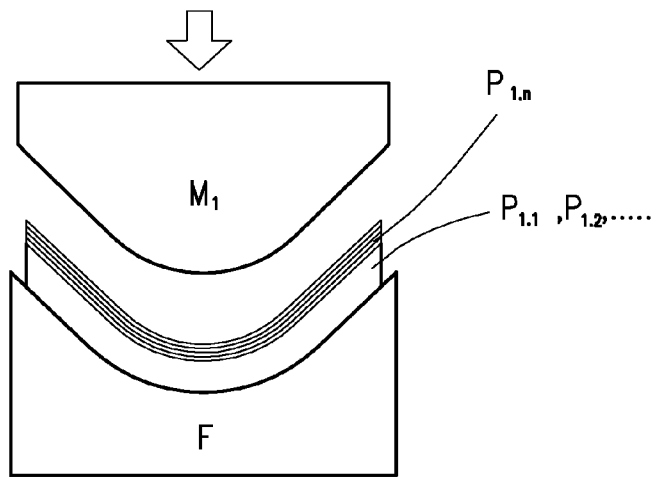
Figure 8B:
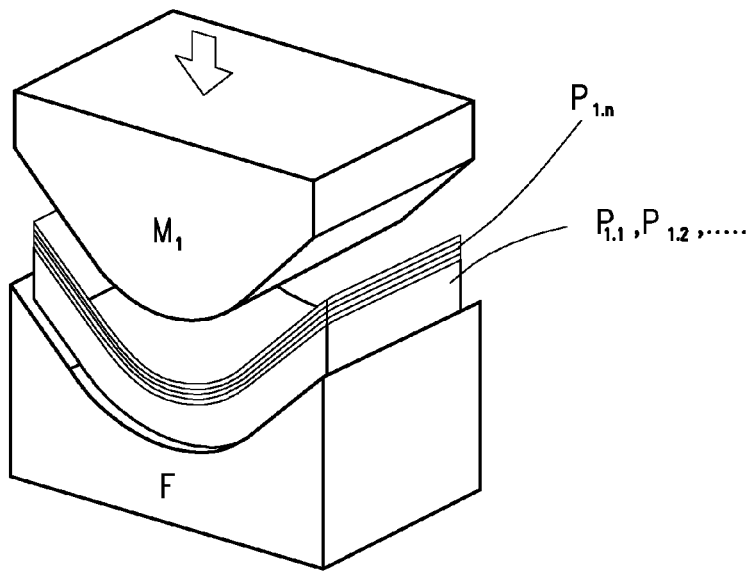
Figure 9A:
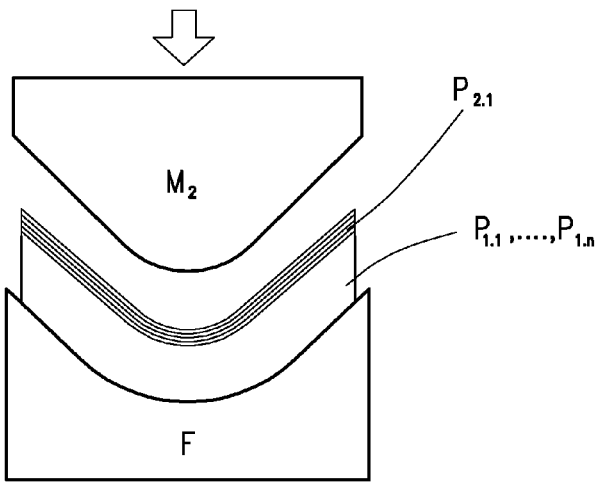
Figure 9B:
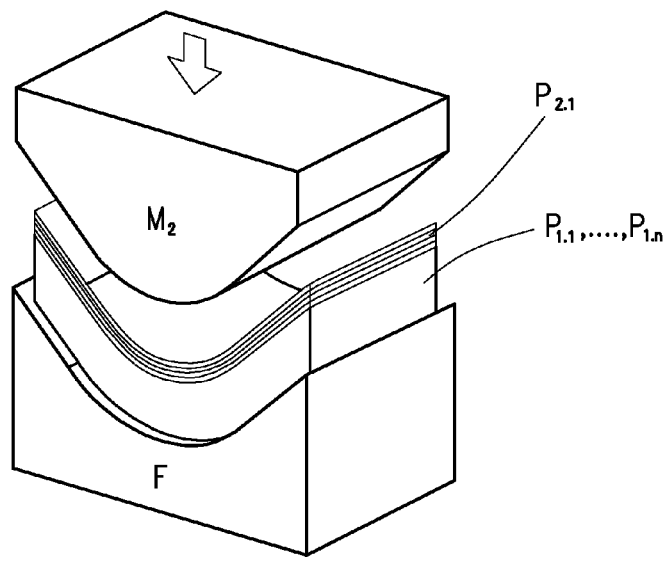
Figure 10A:
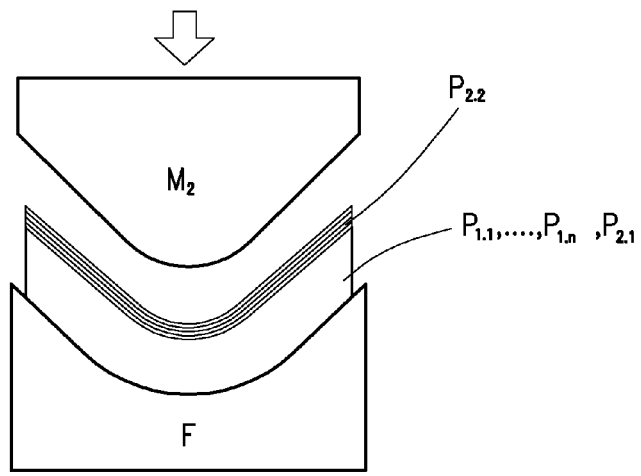
Figure 10B:
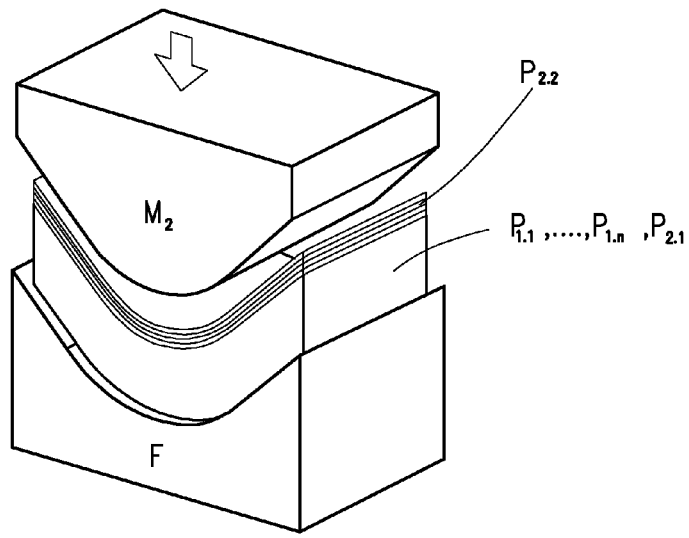
Figure 11A:
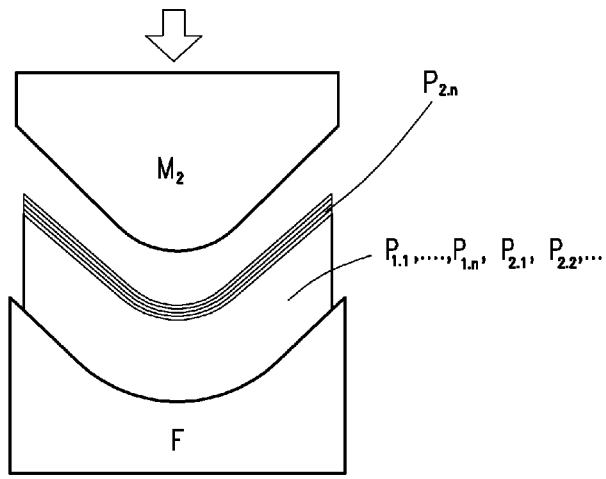
Figure 11B:
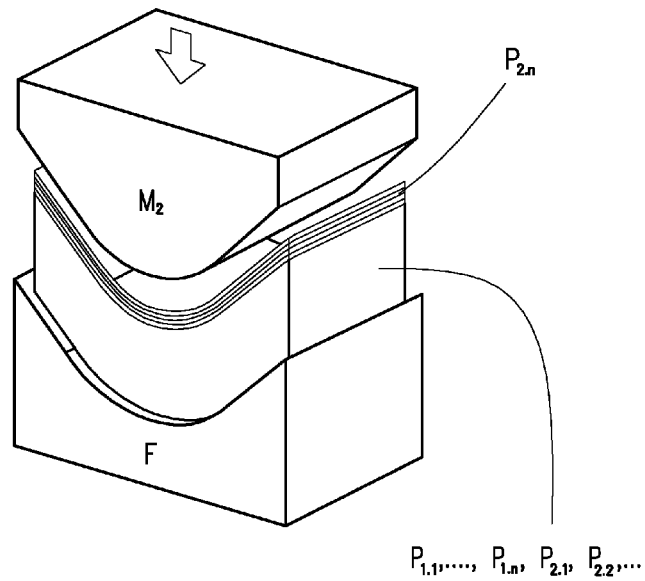
Figure 12A:
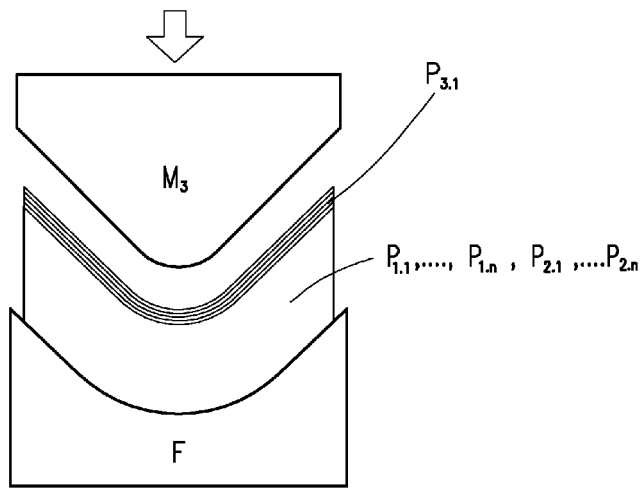
Figure 12B:
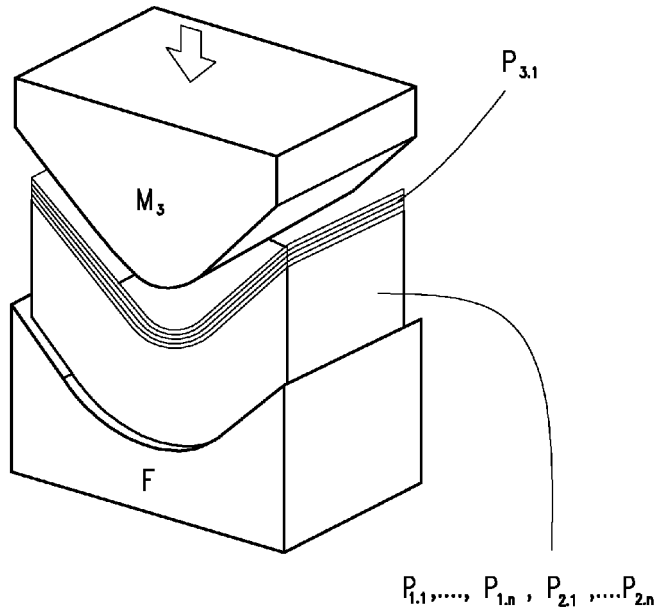
Figure 13A:
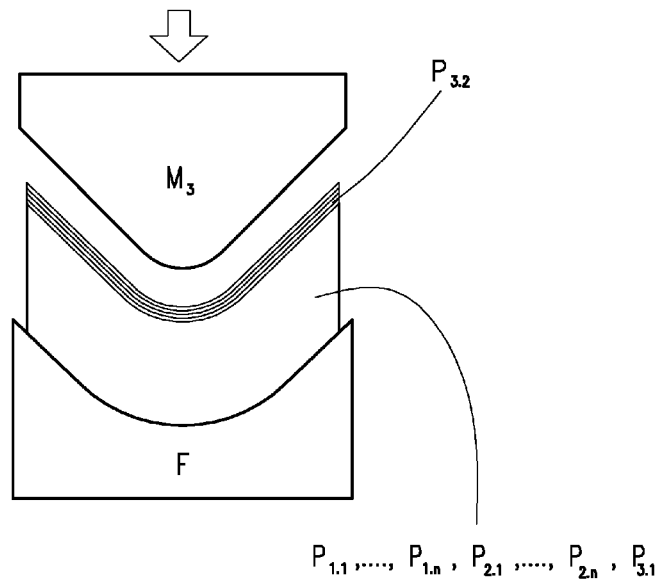
Figure 13B:
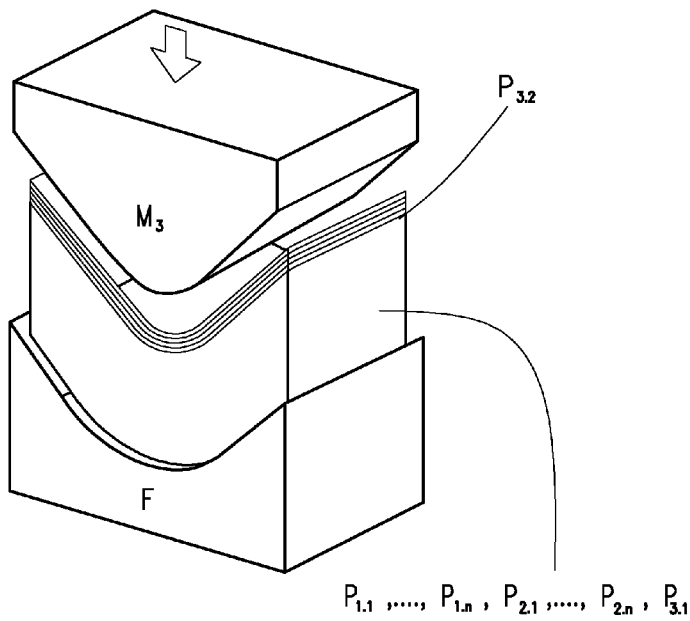
Figure 14A:
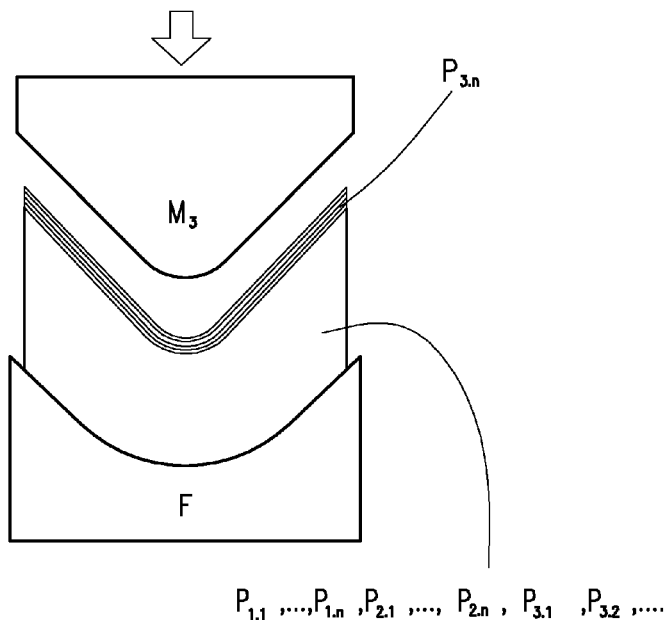
Figure 14B:
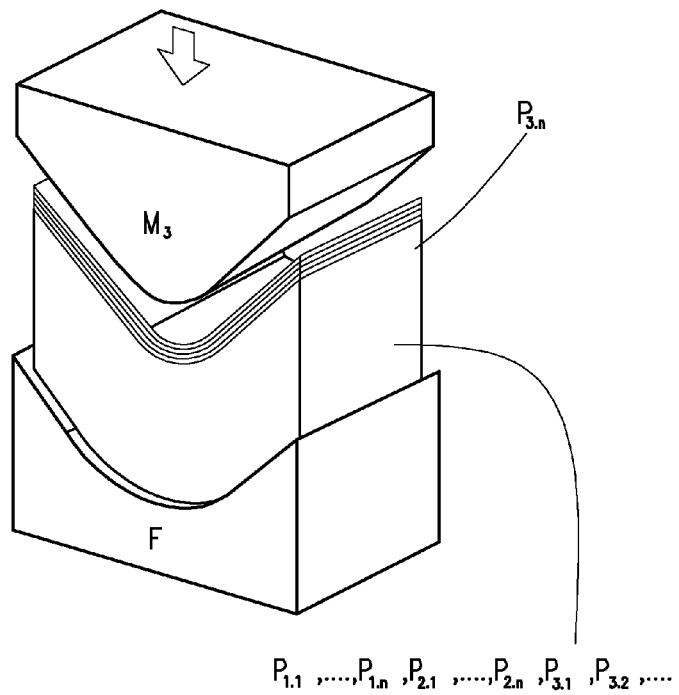

With reference to FIGS. 8A, 8B, the same operation is repeated up to an n-th packet P1.n.

At this point the mold M1 is replaced by the mold M2 of lesser curvature radius and the procedure is continued by stacking and pressing, to deform in a more accentuated curvilinear manner, a new series of packets of sheets P2. This new sequence of operations is illustrated in FIGS. 9A, 9B, 10A, 10B, 11A, 11B, where the new packets are indicated as P2.1, P2.2, . . . , P2.n.

Lastly, the mold M2 is replaced with the mold M3 of lesser curvature radius and the procedure continues by stacking and pressing a new series of packets of sheets P3 to deform them in an even more accentuated curvilinear manner. This sequence of operations is illustrated in FIGS. 12A, 12B, 13A, 13B, 14A, 14B, where the new packets are indicated by P3.1, P3.2, . . . , P3.n.

Figure 15A:
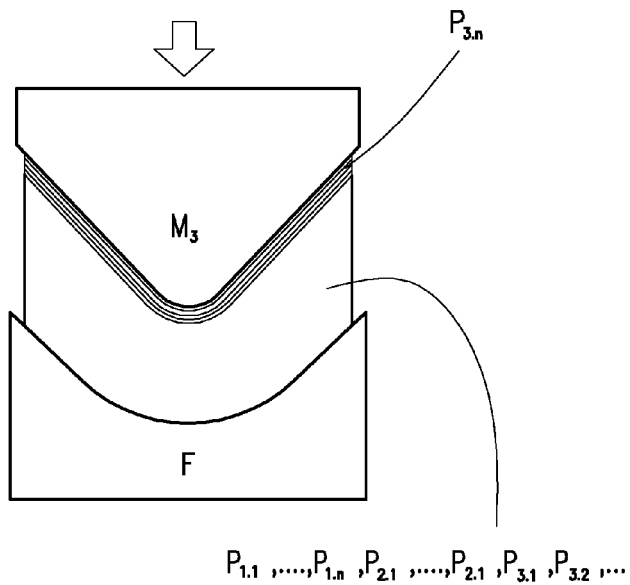
Figure 15B:
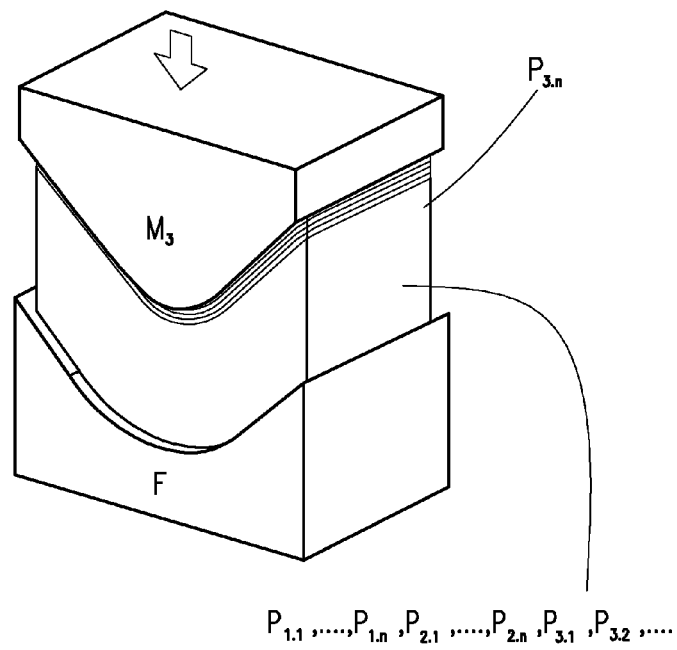

With reference to FIGS. 15A, 15B, all the stacked and shaped packets are kept under pressure at a set temperature and humidity for the time necessary for polymerization of the gluing mixture.

Figure 16A:
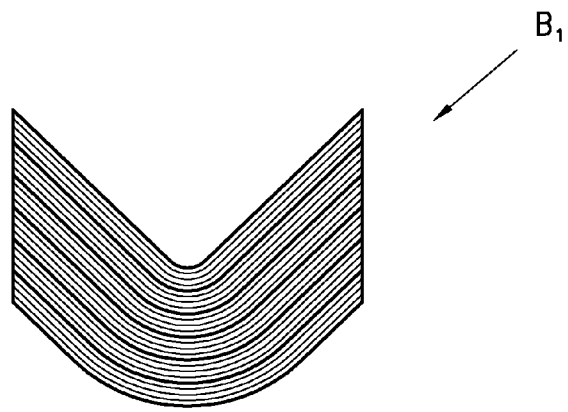
FIGS. 16A, 16B show, respectively in a frontal and perspective view, the product made after the processing of the preceding steps.
Figure 16B:
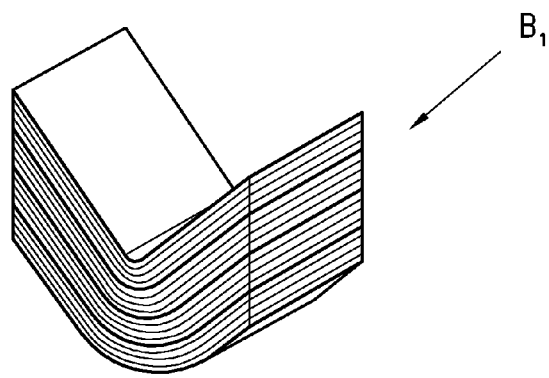
Figure 17A:
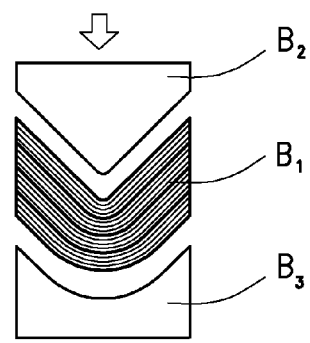
Figure 17B:
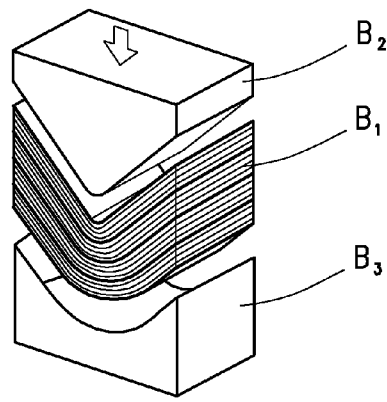

At this point the obtained item is extracted from the mold and countermold, the item being illustrated in FIGS. 16A, 16B, and being shaped as a block of substantially V-shaped multilaminar wood, indicated by B1.

Figure 18A:
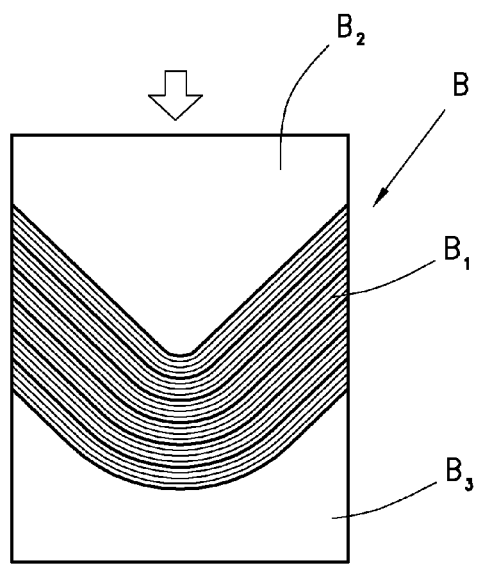
Figure 18B:
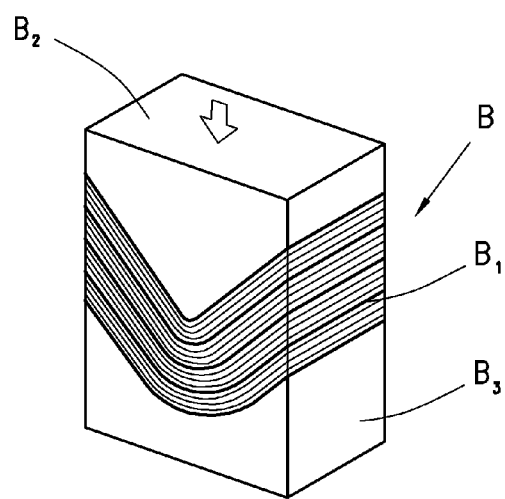

In order to be able to use the obtained item in veneering, it must, however, be returned to a regular parallelpipedon shape. Thus, as illustrated in FIGS. 17A, 17B, 18A, 18B, two items of wood material, B2 and B3, are used, for example of the same wood material as the block B1, for example ayous, which have a complementary shape to the block B1 and are machined with a numerically controlled milling unit like the molds M and the countermold F. The three blocks B1, B2, B3 are joined by gluing and pressing until the block B of FIGS. 18A, 18B is obtained.

Figure 19:
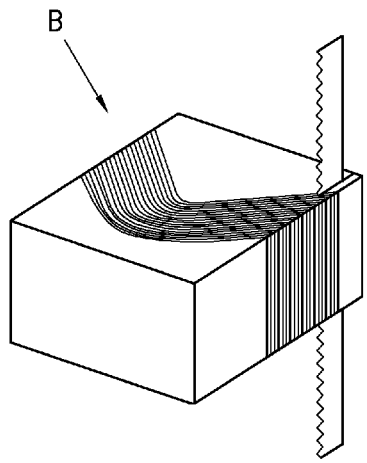
FIGS. 19, 20, 21 show a perspective view of the final processing steps of the completed product.
Figure 20:
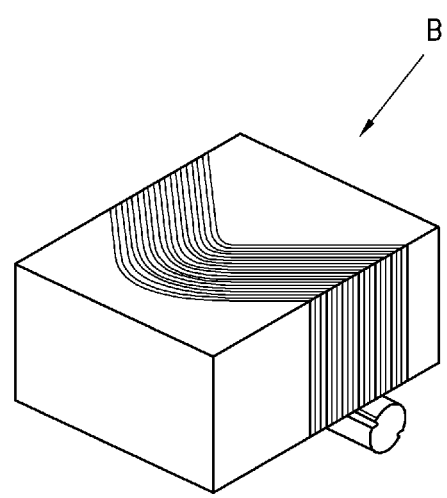

The block B that is thus obtained is subjected to a trimming operation, as shown in FIG. 19, and thus to a squaring operation, as shown in FIG. 20.

Figure 21:
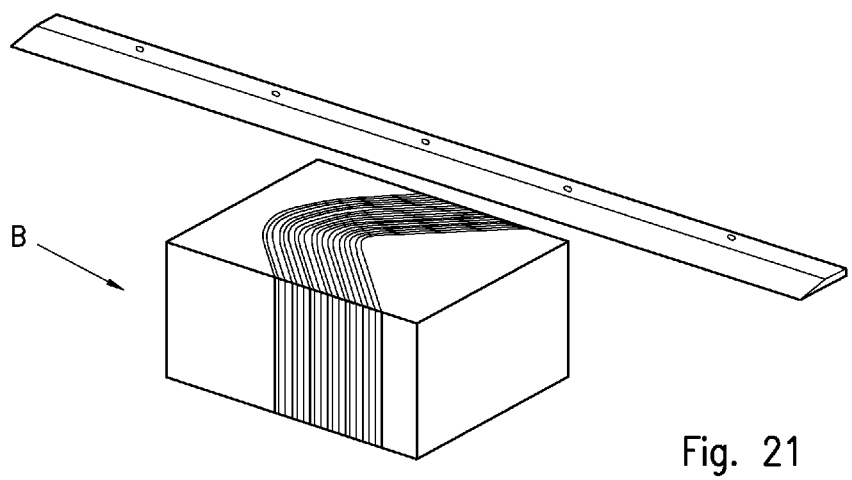
Figure 22A:
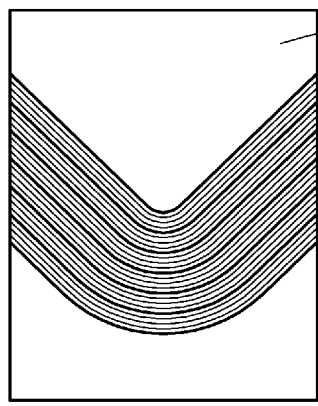
FIGS. 22A, 22B show, respectively in a frontal and perspective view, the obtained multilaminar veneer.
Figure 22B:
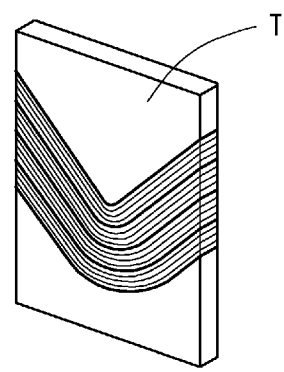

The thus finished block B is ready to be subjected to slicing, as shown in FIG. 21, so as to obtain the decorative multilaminar veneer T illustrated in FIGS. 22A, 22B.

Figure 23A:
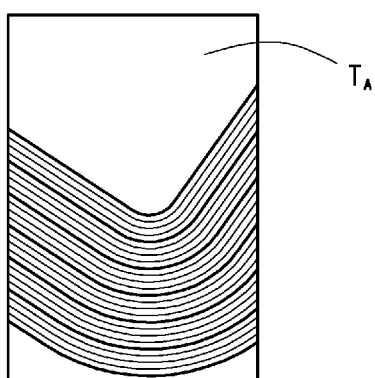
FIGS. 23A, 23B show, respectively in a frontal and perspective view, a multilaminar veneer that is obtainable by varying the shape of mold and countermold.
Figure 23B:
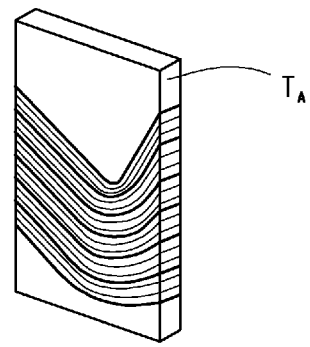

By modifying the profile of molds and countermold from symmetrical to asymmetrical, the veneer TA illustrated in FIGS. 23A, 23B can be obtained.

As can be noted, owing to the method disclosed and illustrated above a decorative multilaminar veneer with accentuated curvilinear curvature shapes can be obtained.

The regularity of these shapes consisting of curved lines that are substantially parallel to one another should be noted.

The procedure is then very simple in the various steps and requires the use of machines already present in the sector of wood working.

Obviously, this type of veneer can be used in many sectors such as furnishing, flooring, doors and windows, automobiles, ships and sailing, objects d'art or others.

It is clear that variations and/or additions to what has been disclosed and illustrated above can be added.

The shape of mold and countermold can be any in the context of the curvilinear, symmetrical or asymmetrical profile. The mold and countermold may or may not have a complementary shape.

Also the number of molds may vary according to the curvilinear design and the dimensions thereof.

The sheets of wood can be only bleached or only dyed.

The various superimposed packets do not necessarily have to be of the same wood material but can be of different wood materials or also of non-wood materials that alternate with the wood materials.

The gluing substance for joining the sheets and the packets may contain pigments or powders.

Any type of adhesive substance can be used to join the sheets of wood and make each packet of sheets.

The block B1 can be sliced directly without the addition of complementary items.

In the various blocks B, material inserts other than wood can be provided, for example inserts made of metal, plastics or other materials.

In the initial step, the sheets of wood for forming the packets can be obtained from a block of multilaminar wood instead of from a log of wood.

What we claim is:

1. Method for making a decorative multilaminar veneer comprising the preliminary step of obtaining sheets of wood from a log of wood or from a block of multilaminar wood, wherein it comprises the successive steps of:
    superimposing and permanently sticking the sheets of wood on top of one another to make a plurality of packets of sheets of wood;
    providing a plurality of male molds and at least one female countermold, wherein each male mold has a convex curvilinear profile with different curvature radiuses from one mold to the other and wherein the female countermold has a concave curvilinear profile;
    arranging, pressing and permanently sticking together several packets, in sequence and superimposed, between the female countermold and in sequence the male molds to progressively deform in a curvilinear manner the packets, replacing in sequence, when a preset height of the superimposed, joined and deformed packets has been reached, a male mold with a profile with a greater curvature radius with a successive male mold with a profile with a lesser curvature radius;
    obtaining a sliceable block formed by said superimposing, joining and deforming of packets of sheets of wood;
    slicing said block to obtain a decorative multilaminar veneer,
wherein, after said block is obtained, inserts of material are added to said block by permanent adhesion and pressing to form a new block of parallelipipedal shape, and wherein said inserts of material substantially correspond to said at least one female countermold and to the male mold with the lesser curvature radius.

2. Method according to claim 1, wherein the profile of the male molds and of the female mold is symmetrical.

3. Method according to claim 1, wherein the profile of the male molds and of the female mold is asymmetrical.

4. Method according to claim 1, wherein before forming into a packet the sheets of wood are dyed.

5. Method according to claim 1, wherein before forming into a packet the sheets of wood are bleached.

6. Method according to claim 4, wherein before being dyed the sheets of wood are bleached.

7. Method according to claim 1, wherein the permanent adhesion of the sheets of wood is obtained by a gluing substance.

8. Method according to claim 1, wherein the permanent adhesion of the block and of the inserts of material is obtained by a gluing substance.

9. Method according to claim 7, wherein the gluing substance contains pigments or powders.

10. Method according to claim 8, wherein the gluing substance contains pigments or powders.

11. Method according to claim 1, wherein said inserts of material consist of wood material.

* * * * *